(No Model.)  5 Sheets—Sheet 1.

E. SAMUEL.
CONDUIT FOR CABLE OR ELECTRICAL RAILWAYS.

No. 354,350. Patented Dec. 14, 1886.

Witnesses:
Alex. Barkoff
John E. Parker

Inventor
Edward Samuel
by his Attorneys
Howson and Son (No Model.) 5 Sheets—Sheet 3.

E. SAMUEL.
CONDUIT FOR CABLE OR ELECTRICAL RAILWAYS.

No. 354,350. Patented Dec. 14, 1886.

(No Model.) 5 Sheets—Sheet 4.
E. SAMUEL.
CONDUIT FOR CABLE OR ELECTRICAL RAILWAYS.
No. 354,350. Patented Dec. 14, 1886.

Witnesses:
Alex. Barkoff
Wm F. Davis

Inventor
Edward Samuel
by his Attorneys
Howson and Sons (No Model.) 5 Sheets—Sheet 5.
E. SAMUEL.
CONDUIT FOR CABLE OR ELECTRICAL RAILWAYS.
No. 354,350. Patented Dec. 14, 1886.
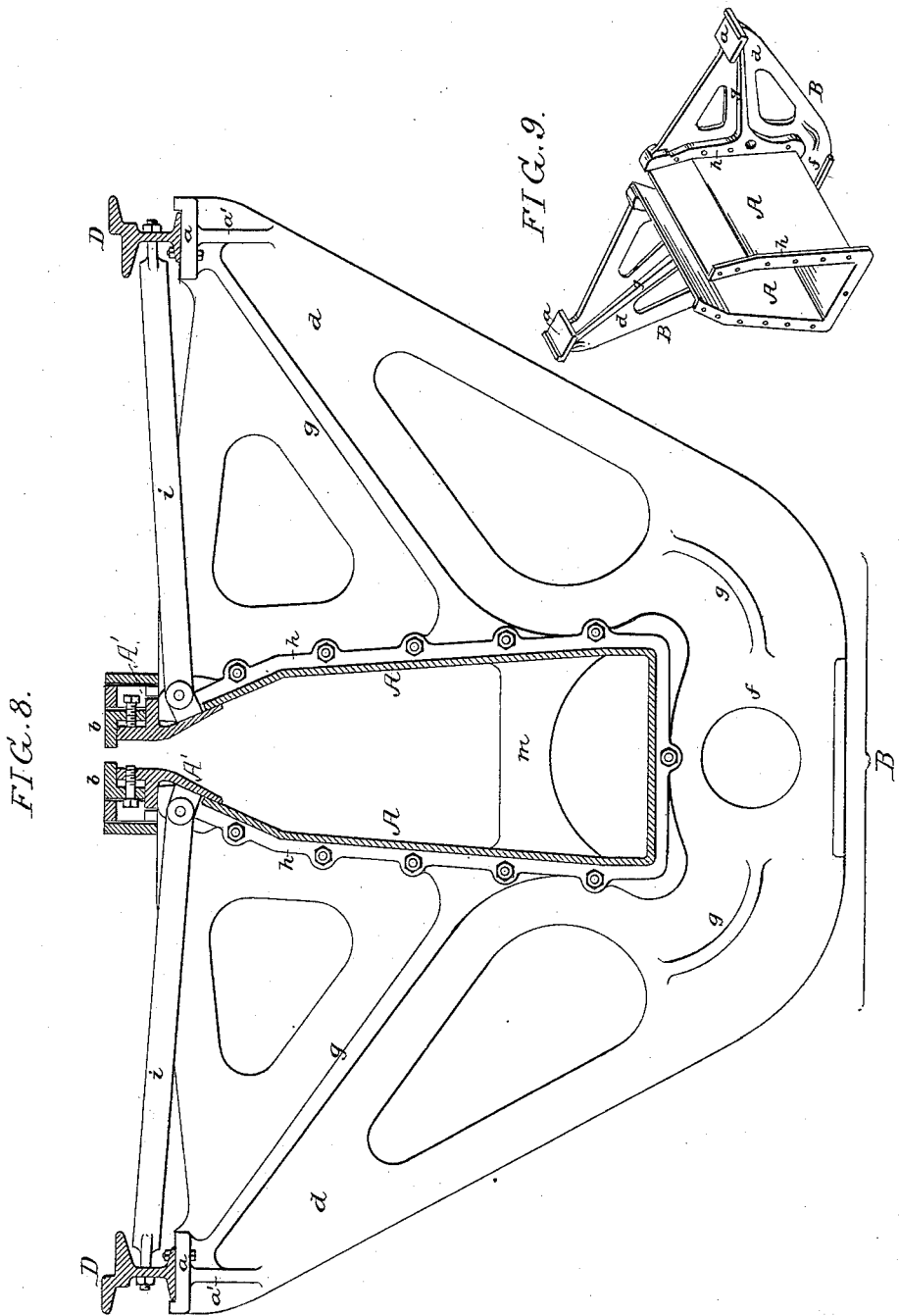
Witnesses:
Alex. Barkoff
William F. Davis
Inventor
Edward Samuel
by his Attorneys
Howson and Son

UNITED STATES PATENT OFFICE.

EDWARD SAMUEL, OF PHILADELPHIA, PENNSYLVANIA, ASSIGNOR TO WILLIAM WHARTON, JR., & CO., (LIMITED,) OF SAME PLACE.

CONDUIT FOR CABLE OR ELECTRICAL RAILWAYS.

SPECIFICATION forming part of Letters Patent No. 354,350, dated December 14, 1886.

Application filed February 26, 1886. Serial No. 193,286. (No model.)

*To all whom it may concern:*

Be it known that I, EDWARD SAMUEL, a citizen of the United States, residing in Philadelphia, Pennsylvania, have invented certain Improvements in Conduits for Cable or Electrical Railways, of which the following is a specification.

One object of my invention is to provide the conduit of a cable or electrical railway with a bracing-frame well calculated to resist any tendency to cause the closing of the slot under the influence of variations in temperature, further objects being to provide for the thorough draining of the conduit and man-hole chambers to permit ready and convenient access to the bearings for the sheaves which support the cable, and to insure the rigidity of the structure forming the permanent way.

Figure 1:
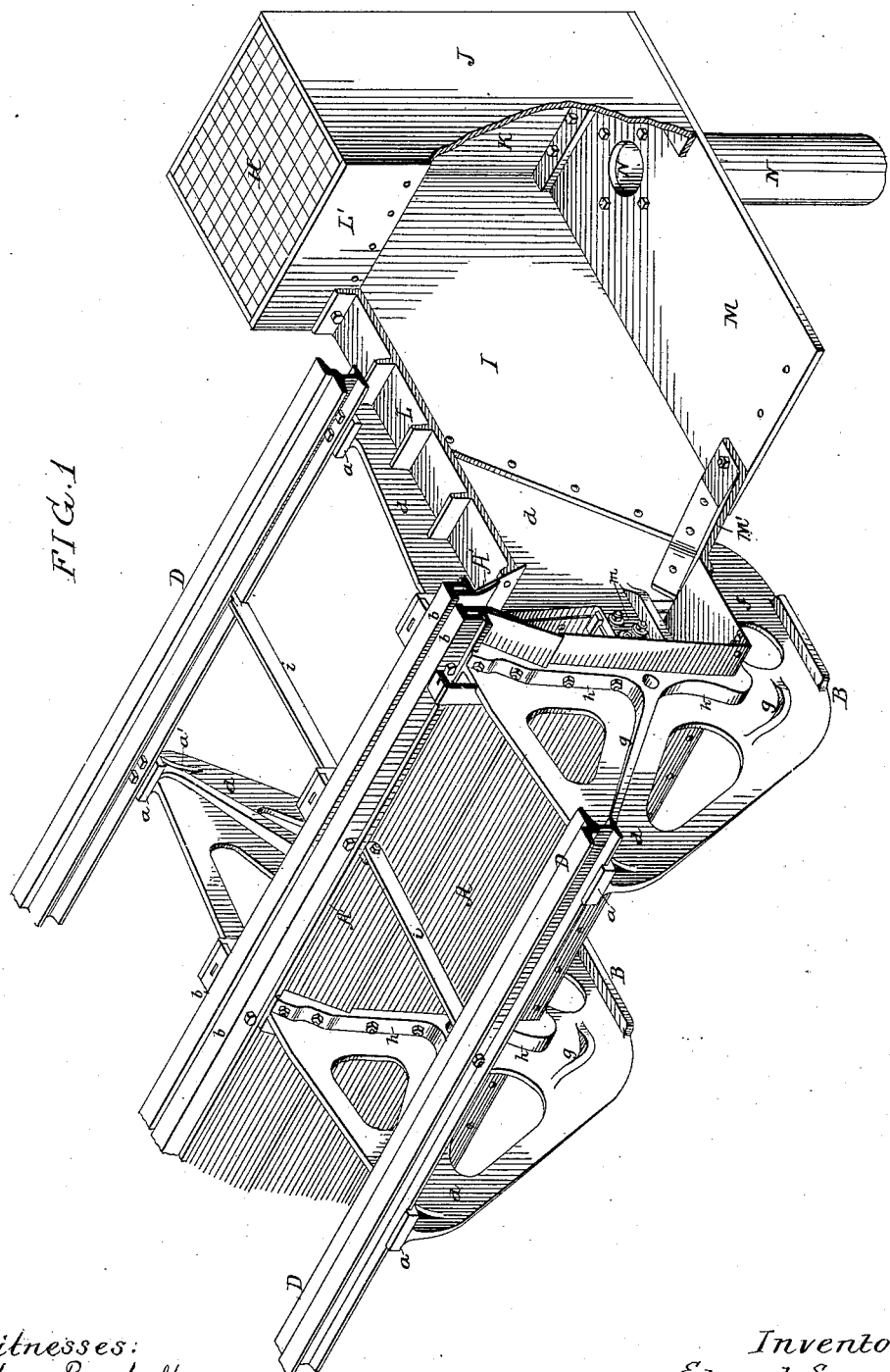
Figure 2:
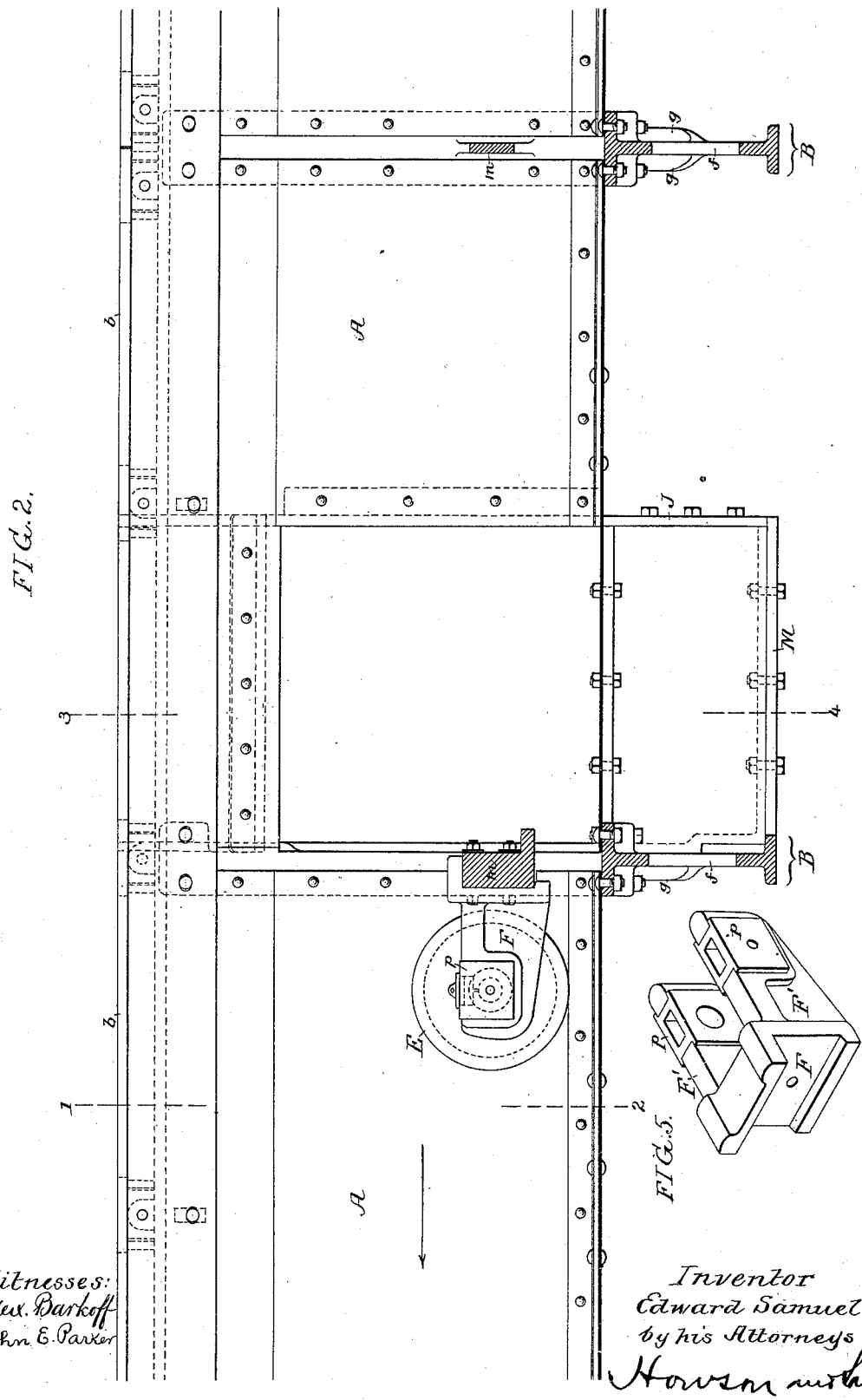
Figure 3:
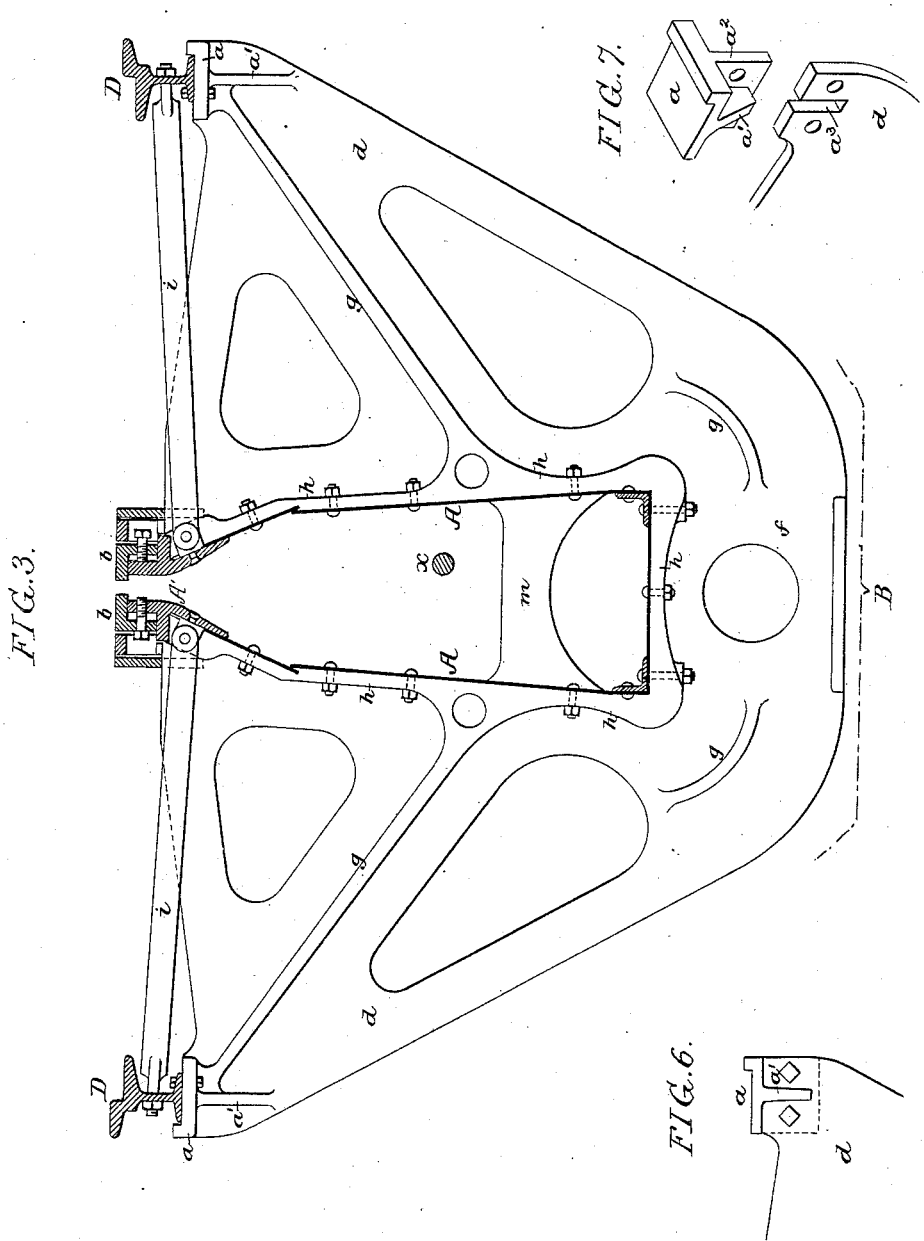
Figure 4:
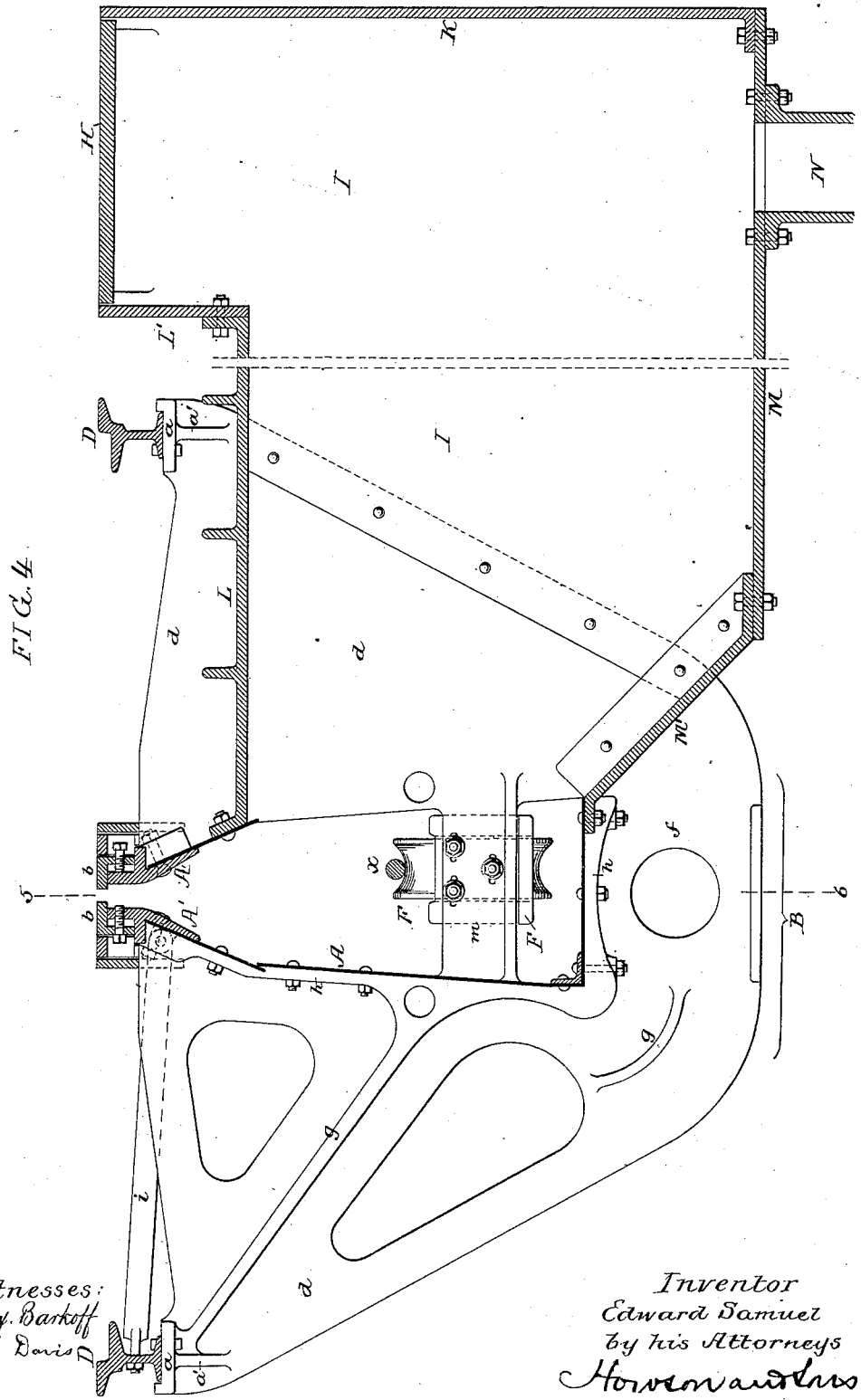

In the accompanying drawings, Figure 1 is a perspective view, partly in section, of my improved conduit and its bracing and rail-supporting frames, parts of the rails being also shown. Fig. 2 is a longitudinal section. Fig. 3 is a transverse section on the line 1 2, Fig. 2. Fig. 4 is a transverse section on the line 3 4, Fig. 2. Fig. 5 is a detached perspective view of one of the brackets having bearings for the journal of a cable-carrying sheave. Figs. 6 and 7 are detached views illustrating a modified construction of part of the device. Fig. 8 is a transverse section illustrating a modification of the invention, and Fig. 9 a perspective view illustrating a special construction of my improved braced conduit.

As shown in Figs. 1 to 4, the conduit consists of a deep and narrow box composed of sheet-metal plates A, properly secured together and to the top bars, A', which are of a more substantial character, this box being contracted in width at the top, and being provided with adjustable slot-irons $b$, similar to those shown in my Patent No. 315,840, April 14, 1885.

The shape of the conduit and the character of the slotted upper portion of the same may, however, be varied without departing from the essential feature of my invention.

Secured to the conduit at appropriate intervals are the bracing-frames B, each of which comprises opposite side webs, $d$, and a connecting-web, $f$, beneath the conduit, these webs being provided with suitable openings in order to lighten the same, and being furnished with proper strengthening-ribs $g$. The inner edge of each frame has flanges $h$, to which the plates A and bars A' of the conduit are bolted, and the outer portions of the frames have at the top rail-supporting chairs $a$ and strengthening-ribs $a'$ therefor. The rails, D, which I prefer to use are in the form of girders, the base-flanges of which are secured to the chairs $a$ of the bracing-frames B, so that said rails serve as longitudinal girders, to stiffen the outer portions of said bracing-frames and maintain them at the proper longitudinal distance from each other. The rails are connected to the upper bars, A', of the conduit at suitable intervals by tie-bars $i$.

Conduits for cable railways are necessarily made of considerable depth, in order to provide beneath the cable and its supporting-sheaves a space for the accumulation of street dirt or other refuse or for the flow of water or liquid sewage entering the conduit through the slot; hence in order to insure the proper strength of the bracing-frames B it is advisable to connect the opposite webs $d$ of the same at a point above the lower web, $f$. I therefore provide each frame with a transverse brace, $m$, passing through the conduit from one side web of the frame to the other, this brace being as near the top of the frame as the cable and grip will allow, and being at such a distance from the bottom of the conduit as not to interfere with the free flow of water or other liquid through the same.

In Fig. 3 the position of the cable is indicated at $x$. Each side web of the bracing-frame has, it will be observed, a diagonal strut extending from the outer rail-carrying portion of the web to the transverse brace which crosses the conduit, thus providing in effect a continuous transverse brace from rail to rail.

Where a man-hole chamber is to be formed, one of the webs $d$ of the frame B is made plain, so as to form part of one of the sides of the man-hole chamber, other side plates, I and J, an end plate, K, and top and bottom plates, L L′ and M M′, serving to complete the inclosure of the chamber, the man-hole opening of which is provided with a cover-plate, H. The cross-brace $m$ adjacent to the opening is also made much heavier than the cross-braces located at other points, in order that it may provide an efficient support for the bracket F, projecting arms F′ on which support the boxes $p$, in which are formed the bearings for the journal of the cable-carrying sheave E.

The bottom of the man-hole chamber of the conduit is on a lower level than the bottom of the conduit itself, that portion, M′, of the bottom plate adjacent to the conduit being inclined, as shown in Fig. 4. This not only provides a more convenient means of access to the cable-supporting sheave and its bearings than is provided when the bottom of the man-hole chamber is flush with the bottom of the conduit, but it also insures the thorough draining of the conduit into the man-hole chamber, which is in communication with any neighboring sewer through a pipe, N. The opening into the man-hole chamber is outside of the track, so that in addition to its increased depth said chamber is of such lateral dimensions as to afford ample accommodation for the workman whose duty it is to attend to the oiling or repairing of the sheaves, the opening in the side of the conduit extending from the bottom of the same to the top of the man-hole chamber, or thereabout, and being unobstructed throughout, so as to permit ready access to the interior of the conduit from the man-hole chamber.

Instead of casting the rail-supporting shoes $a$ with the bracing-frames B, said shoes may be made separate therefrom, as shown in Figs. 6 and 7, for instance, each shoe having a flange, $a^2$, whereby it may be bolted to the web $d$, and the latter having a slot, $a^3$, for the reception of the strengthening-ribs $a′$ of the shoe.

The conduit A may, if desired, be composed of sections of cast-iron, having flanges bolted to the webs of the supporting-frames B, as shown in Fig. 8, for instance; but when a cast-iron conduit is used I prefer to cast the frame B and a section of the conduit in one piece, as shown in Fig. 9.

It will be observed, on reference to Fig. 4, that the brace $m$ is slotted for the reception of the stems of the bolts, whereby the bracket F is secured to said brace, so that the bracket may be adjusted laterally, in order to insure the proper relation of the cable and its supporting-sheave.

The top bars, A′, of the conduit, being secured directly to the bracing-frames, serve as girders to impart longitudinal stiffness to the permanent way at points adjacent to the conduit, the plates A of the conduit not being relied upon for this purpose, and the tying of the bars A′ to the rails at points between the frames B still further aids in making the permanent way a unit.

I claim as my invention—

1. The combination of a conduit for cable or electrical railways with rail-carrying frames, each having opposite side webs, with transverse brace passing through the conduit above the bottom of the same, each side web comprising an upper portion extending from the top bar of the conduit to the outer rail-carrying portion of the frame, and a strut extending from said outer portion of the frame to the transverse brace above the bottom of the conduit, all substantially as specified.

2. The combination of a conduit for cable or electrical railways with rail-carrying frames, each consisting of opposite side webs, with a transverse brace passing through the conduit above the bottom of the same, and a connecting-web passing beneath the conduit, and each side web having an outer rail-carrying portion, a strut extending therefrom to the brace above the bottom of the conduit, a portion above the strut extending to the top bar of the conduit, and a portion below the strut extending to the web beneath the conduit, all substantially as specified.

3. The combination of a conduit comprising the sheet-metal body A and rigid top bars, A′, longitudinal girders forming the track, bracing-frames secured to said girders and to the top bars, A′, of the conduit, and tie-bars connecting said bars A′ to the girders at points between the bracing-frames, all substantially as specified.

4. The combination of the conduit and cable-supporting sheaves contained therein with a man-hole chamber extending laterally from the conduit, and having its inlet-opening beyond the limits of the track, the bottom of said chamber being lower than the bottom of the conduit, and the side of the conduit having an unobstructed opening extending from the bottom of said conduit to the top of the chamber, or thereabout, so as to permit free access to the interior of the conduit from the man-hole chamber, all substantially as specified.

In testimony whereof I have signed my name to this specification in the presence of two subscribing witnesses.

EDWD. SAMUEL.

Witnesses:
WM. F. DAVIS,
HARRY SMITH.